(12) United States Patent
Revankar et al.

(10) Patent No.: US 10,421,428 B2
(45) Date of Patent: Sep. 24, 2019

(54) ACTIVE PEDESTRIAN PROTECTION SYSTEM

(71) Applicant: TK Holdings Inc., Auburn Hills, MI (US)

(72) Inventors: Vidyakant Chandrakant Revankar, Rochester Hills, MI (US); Larry M. Wilmot, Oxford, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 15/450,498

(22) Filed: Mar. 6, 2017

(65) Prior Publication Data

US 2017/0182971 A1 Jun. 29, 2017

Related U.S. Application Data

(63) Continuation of application No. 14/588,283, filed on Dec. 31, 2014, now Pat. No. 9,586,555, which is a
(Continued)

(51) Int. Cl.
*B60R 21/36* (2011.01)
*B60R 21/34* (2011.01)
(Continued)

(52) U.S. Cl.
CPC ............. *B60R 21/36* (2013.01); *B60R 19/40* (2013.01); *B60R 21/0134* (2013.01);
(Continued)

(58) Field of Classification Search
CPC ............ B60R 21/36; B60R 2021/0051; B60R 2021/0083; B60R 2021/346; B60R 2021/0053
See application file for complete search history.

(56) References Cited

U.S. PATENT DOCUMENTS 3,236,552 A 2/1966 Percifull
3,525,535 A 8/1970 Kobori
(Continued)

FOREIGN PATENT DOCUMENTS

CN 103434476 A 12/2013
DE 102014010872 A1 * 1/2016
(Continued)

OTHER PUBLICATIONS

Chinese Office Action, dated Sep. 26, 2017, in connection with the Chinese Application No. 201480071953.5.
(Continued)

*Primary Examiner* — Darlene P Condra
(74) *Attorney, Agent, or Firm* — Meunier Carlin & Curfman LLC

(57) ABSTRACT

A method for cushioning a pedestrian during contact with a moving vehicle. The method includes steps providing an energy-absorbing pedestrian interface structured to cushion the pedestrian during contact, providing an interface deployment mechanism operatively coupled to the interface and structured to move the interface between a stowed position and a deployed position, and moving the pedestrian interface to the deployed position when the vehicle is in motion and prior to contact between the pedestrian and the vehicle.

10 Claims, 12 Drawing Sheets

Related U.S. Application Data continuation-in-part of application No. 14/557,385, filed on Dec. 1, 2014, now Pat. No. 9,365,176.

(60) Provisional application No. 61/922,705, filed on Dec. 31, 2013, provisional application No. 61/910,270, filed on Nov. 29, 2013, provisional application No. 61/910,265, filed on Nov. 29, 2013.

(51) Int. Cl.
| | |
|---|---|
| *B60R 19/40* | (2006.01) |
| *B60R 21/0134* | (2006.01) |
| *B60R 21/0136* | (2006.01) |
| *B60R 19/02* | (2006.01) |
| *B60R 19/24* | (2006.01) |
| *B60R 19/38* | (2006.01) |

(52) U.S. Cl.
CPC .......... *B60R 21/0136* (2013.01); *B60R 21/34* (2013.01); *B60R 19/02* (2013.01); *B60R 19/24* (2013.01); *B60R 19/38* (2013.01)

(56) References Cited

U.S. PATENT DOCUMENTS

| | | | |
|---|---|---|---|
| 3,656,791 A | 4/1972 | Truesdell | |
| 3,779,325 A | 12/1973 | Liuhanen et al. | |
| 4,176,858 A | 12/1979 | Kornhauser et al. | |
| 5,106,137 A | 4/1992 | Curtis et al. | |
| 5,725,265 A | 3/1998 | Baber et al. | |
| 5,810,427 A | 9/1998 | Hartmann et al. | |
| 6,089,628 A | 7/2000 | Schuster | |
| 6,106,038 A | 8/2000 | Dreher et al. | |
| 6,276,483 B1 | 8/2001 | Sinnhuber et al. | |
| 6,293,362 B1 | 9/2001 | Sasaki et al. | |
| 6,334,639 B1 | 1/2002 | Vives et al. | |
| 6,394,512 B1 | 5/2002 | Schuster et al. | |
| 6,415,883 B1* | 7/2002 | Myrholt | B60R 21/38 |
| | | | 180/271 |
| 6,612,608 B2 | 9/2003 | Schmidt et al. | |
| 6,623,054 B1* | 9/2003 | Palmquist | B60R 19/40 |
| | | | 180/169 |
| 6,637,536 B1* | 10/2003 | Polz | B60R 21/38 |
| | | | 180/271 |
| 6,637,788 B1 | 10/2003 | Zöllner et al. | |
| 6,701,569 B1 | 3/2004 | Benner | |
| 6,726,260 B1 | 4/2004 | Wang et al. | |
| 6,834,899 B2* | 12/2004 | Lindsey | B60R 19/483 |
| | | | 293/118 |
| 6,923,483 B2 | 8/2005 | Curry et al. | |
| 7,413,049 B2 | 8/2008 | Schramm et al. | |
| 7,699,383 B2 | 4/2010 | Fukukawa et al. | |
| 7,703,819 B2 | 4/2010 | Finney et al. | |
| 7,757,804 B1 | 7/2010 | Li et al. | |
| 7,881,843 B2 | 2/2011 | Murakami et al. | |
| 7,997,375 B2 | 8/2011 | Shaw et al. | |
| 8,141,918 B2 | 3/2012 | Miller et al. | |
| 8,950,800 B1* | 2/2015 | Farooq | B60R 21/34 |
| | | | 293/118 |
| 9,033,092 B1 | 5/2015 | Rao | |
| 9,102,290 B1* | 8/2015 | Cuddihy | B60R 19/023 |
| 2001/0030431 A1 | 10/2001 | Killday | |
| 2002/0014761 A1* | 2/2002 | Miyasaka | B60R 21/36 |
| | | | 280/730.1 |
| 2004/0160071 A1 | 8/2004 | Suganuma et al. | |
| 2004/0189024 A1 | 9/2004 | Lindsey | |
| 2005/0017519 A1 | 1/2005 | Regnell et al. | |
| 2006/0175115 A1* | 8/2006 | Howard | B60R 21/36 |
| | | | 180/274 |
| 2007/0125589 A1 | 6/2007 | Murphy | |
| 2008/0097699 A1 | 4/2008 | Ono | |
| 2009/0145681 A1* | 6/2009 | Hayashi | B60R 21/38 |
| | | | 180/274 |
| 2009/0152880 A1* | 6/2009 | Donovan | B60R 19/40 |
| | | | 293/4 |
| 2009/0242308 A1 | 10/2009 | Kitte et al. | |
| 2009/0289471 A1 | 11/2009 | Finney | |
| 2010/0156080 A1* | 6/2010 | Napier | B60D 1/00 |
| | | | 280/762 |
| 2013/0119681 A1 | 5/2013 | Mendis et al. | |
| 2014/0332305 A1* | 11/2014 | Thomas | B60R 21/36 |
| | | | 180/274 |
| 2015/0151700 A1 | 6/2015 | Revankar | |
| 2015/0183395 A1 | 7/2015 | Revankar | |
| 2015/0224956 A1 | 8/2015 | Takenaka | |
| 2015/0283967 A1 | 10/2015 | Cuddihy et al. | |
| 2017/0217400 A1* | 8/2017 | Battermann | B60R 21/38 |

FOREIGN PATENT DOCUMENTS

| | | |
|---|---|---|
| EP | 1619089 A1 | 1/2006 |
| EP | 1800960 A2 | 6/2007 |
| EP | 1867525 A2 | 12/2007 |
| EP | 1867526 A2 | 12/2007 |
| EP | 2189335 A1 | 5/2010 |
| EP | 1986895 B1 | 11/2015 |
| GB | 2384215 A | 7/2003 |
| GB | 2397559 A * | 7/2004 |
| JP | 2004074971 | 3/2004 |
| JP | 2005132219 A | 5/2005 |
| JP | 2005132258 | 5/2005 |
| JP | 2006298150 | 11/2006 |
| JP | 2013001386 A | 1/2013 |
| WO | 2005009806 A1 | 2/2005 |
| WO | 2013117552 | 8/2013 |

OTHER PUBLICATIONS

International Search Report and Written Opinion issued in International Application No. PCT/US14/073087, dated Apr. 22, 2015.
Office Action dated Jul. 8, 2015 issued in related U.S. Appl. No. 14/586,877 dated Jan. 24, 2017, as U.S. Pat. No. 9,550,464.
Office Action issued in related U.S. Appl. No. 14/586,877, dated Dec. 1, 2015.
Office Action issued in related U.S. Appl. No. 14/586,877, dated May 25, 2016.
Office Action dated Jun. 22, 2015 issued in related U.S. Appl. No. 14/557,385 dated Jun. 14, 2016, as U.S. Pat. No. 9,365,176.
U.S. Appl. No. 14/557,385, filed Dec. 1, 2014, and dated Jun. 14, 2016, as U.S. Pat. No. 9,365,176, and its file history.
U.S. Appl. No. 14/586,877, filed Dec. 30, 2014, and dated Jan. 24, 2017, as U.S. Pat. No. 9,550,464, and its file history.
Japanese Office Action issued in JP 2016-542989, dated Apr. 17, 2018.
Office Action Issued in co-pending Chinese Application No. 201480071953.5, dated Apr. 20, 2017.
Third Chinese Office Action, dated May 23, 2018, in connect with Chinese Application No. 201480071953.5.
Chinese Search Report, dated May 23, 2018, in connect with Chinese Application No. 201480071953.5.
Japanese Office Action, dated Dec. 18, 2018, in connection with Japanese Application No. 2016-542989.
Chinese Office Action, dated Feb. 19, 2019, in connection with Chinese Application No. 201480071953.5.

* cited by examiner

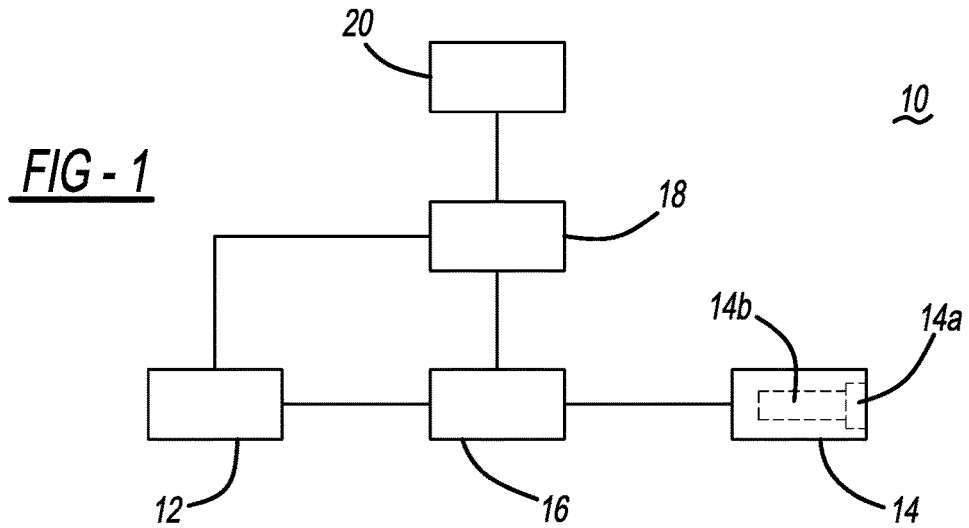
FIG - 1
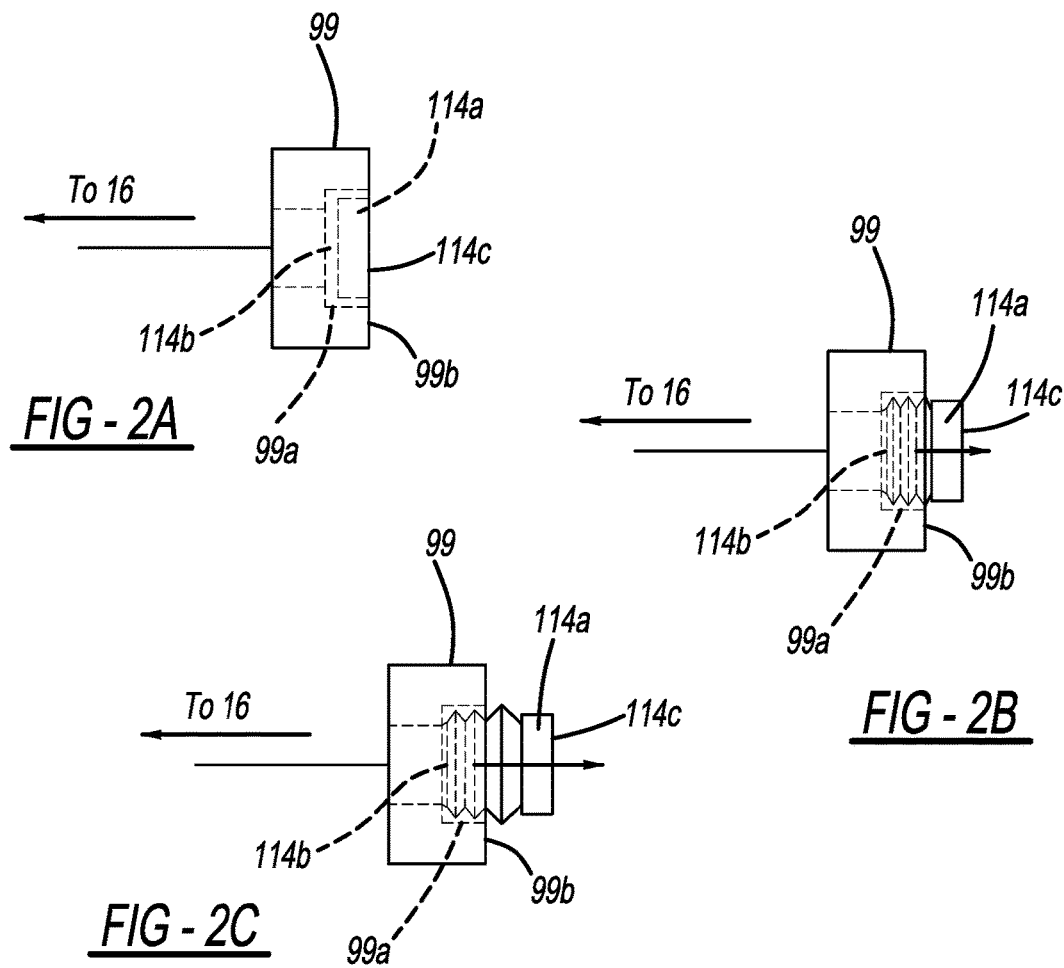
FIG - 2A
FIG - 2B
FIG - 2C

ACTIVE PEDESTRIAN PROTECTION SYSTEM

CROSS-REFERENCE TO RELATED APPLICATIONS

This application is a continuation application of U.S. patent application Ser. No. 14/588,283, filed Dec. 31, 2014, which claims priority to U.S. Provisional Application Ser. No. 61/922,705, filed on Dec. 31, 2013, the disclosures of which are incorporated herein by reference in their entireties. U.S. patent application Ser. No. 14/588,283 is a continuation-in-part of U.S. application Ser. No. 14/557,385, filed on Dec. 1, 2014, which claims the benefit of U.S. Provisional Application Ser. Nos. 61/910,270 and 61/910,265, both filed on Nov. 29, 2013, the disclosures of which are incorporated herein by reference in their entireties.

BACKGROUND OF THE INVENTION

The present invention relates to vehicle-mounted safety systems for helping to prevent injury to pedestrians in the event of contact with a moving vehicle.

Modern vehicles use combinations of sensors and other mechanisms to pre-sense and confirm vehicle impacts with pedestrians. Once sensors have confirmed physical impact with a pedestrian the rapid deployment of expendable protective devices occurs. The downfalls of this approach are: (1) pre-contact sensing is expensive; (2) pre-contact sensing is not reliable or cost effective enough to commit to pre-deployment of protective devices. (i.e., deployment prior to contact, so as to be in position in the event of contact); (3) physical contact sensing is required (with or without pre-sensing) to confirm impact.

Thus a need exists for a pedestrian safety system including components capable of operatively coupling to sensors and a controller that are present in the vehicle for purposes other than operation of the safety system. A need also exists for a system which is resettable and operable to pre-position an energy-absorbing device for contact with a pedestrian, prior to contact.

SUMMARY OF THE INVENTION

In one aspect of the embodiments described herein, a method is provided for cushioning a pedestrian during contact with a moving vehicle. The method includes steps providing an energy-absorbing pedestrian interface structured to cushion the pedestrian during contact, providing an interface deployment mechanism operatively coupled to the interface and structured to move the interface between a stowed position and a deployed position, and moving the pedestrian interface to the deployed position when the vehicle is in motion and prior to contact between the pedestrian and the vehicle.

In another aspect of the embodiments described herein, a method is provided for positioning an energy-absorbing pedestrian interface to receive energy from contact between a pedestrian and a moving vehicle. The method includes steps of providing an interface deployment mechanism operatively coupled to the interface and structured to move the interface between a first position and a second position, and moving the interface from the first position to the second position when the vehicle is moving at or above a first predetermined speed.

In another aspect of the embodiments described herein, an active pedestrian protection system is provided. The system includes an energy-absorbent pedestrian interface structured to cushion a pedestrian during a collision event between the pedestrian and a vehicle, and a pedestrian interface deployment mechanism operatively coupled to the interface and configured to move the interface between a stowed position and a deployed position responsive to a speed of the vehicle.

BRIEF DESCRIPTION OF THE DRAWINGS

In the drawings illustrating the various embodiments described herein:

FIG. 1 shows is a schematic view of an active pedestrian protection system in accordance with embodiments described herein.

FIGS. 2A-2C show a schematic representation of a deployment progression of a pedestrian interface, from a non-deployed or stowed condition to a deployed position or condition, in accordance with an embodiment described herein.

DETAILED DESCRIPTION

Figure 3A:
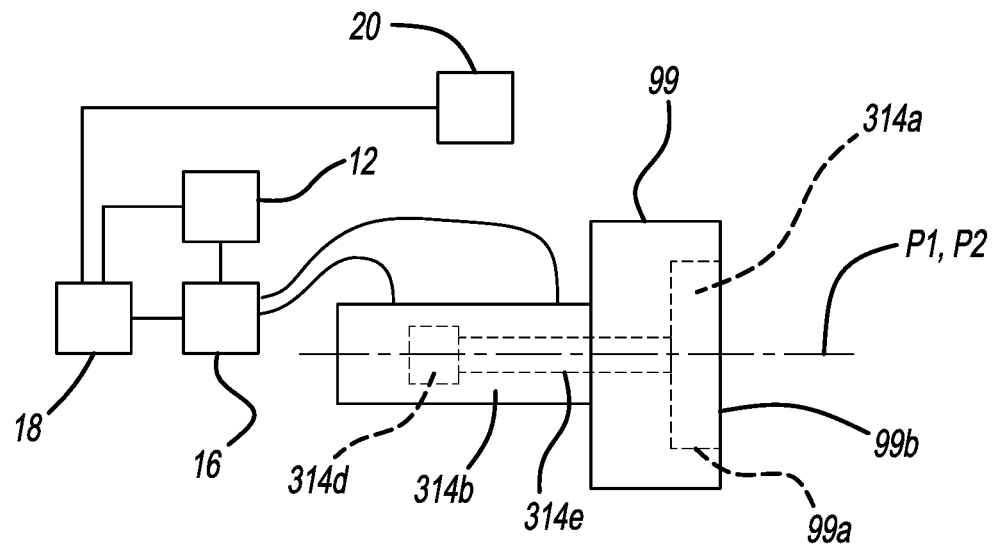
FIGS. 3A-3B show a schematic representation of a deployment progression of a pedestrian interface, from a non-deployed or stowed condition to a deployed position or condition, in accordance with another embodiment described herein.

Like reference numerals refer to like parts throughout the description of several views of the drawings. In addition, while target values may be recited for the dimensions of the various features described herein, it is understood that these values may vary slightly due to such factors as manufacturing tolerances, and also that such variations are within the contemplated scope of the embodiments described herein.

The embodiments described herein relate to an active pedestrian protection system. The system incorporates and moves one or more energy-absorbing components between a stowed or non-deployed configuration, and a deployed configuration. The energy-absorbing component(s) are moved to the deployed configuration prior to contact with a pedestrian and based on the speed of the vehicle, thereby pre-positioning the energy-absorbing component(s) prior to contact with the pedestrian. The system also returns the energy-absorbing component(s) from the deployed configuration to the stowed or non-deployed configuration, also based on the speed of the vehicle. The energy-absorbing component(s) are designed to aid in reducing contact forces between the vehicle and the pedestrian.

FIG. 1 shows a schematic view of an active pedestrian protection system 10 in accordance with embodiments described herein. In the embodiment shown in FIG. 1, the protection system 10 includes a pressurized fluid source 12, a pressurized fluid-actuatable energy-absorbing mechanism 14, a valve mechanism 16 operatively coupled to the fluid source 12 and to the energy-absorbing mechanism 14, and a controller 18 operatively coupled to the valve mechanism 16, the fluid source 12, and to a vehicle speed information source 20 (for example, an on-board speed sensor). The valve mechanism 16 may include any necessary fluid flow control components (including valving, solenoids, etc.) and is operable by controller 18 to control fluid flow to and from the energy-absorbing mechanism 14. Controller 18 may control operation of the valve mechanism 16 responsive to information relating to the speed of the vehicle. A pressure relief valve or to other fluid venting mechanism (not shown) may be incorporated into the system to relieve excess system pressure if the system pressure exceeds a certain level.

In particular embodiments, a pedestrian protection system 10 as described herein is built into the structure of the vehicle. The mechanism for deploying a pedestrian interface as described herein may be operatively coupled to a vehicle controller and/or to sensors installed in the vehicle during vehicle manufacture.

Pressurized fluid source 12 supplies pressurized fluid (for example, compressed air, a compressed gas, or a hydraulic fluid such as an oil) to the energy-absorbing mechanism 14, causing the mechanism to actuate or deploy in a manner described herein. Fluid source 12 may incorporate (or have operatively coupled thereto) a pump or compressor (such as a gas compressor, for example) (not shown). The fluid source may be operable by the controller to control the direction of fluid flow from the fluid source (either toward or away from the fluid-actuatable energy-absorbing mechanism 14) in a known manner by controller 18, by reversing the flow direction in the pump or compressor, for example. This enables repeated inflation and deflation of an inflatable energy-absorbing member as described herein. Electronically-controllable valve mechanisms suitable for the purposes described herein may be obtained from any of a variety of vendors (for example, WIC Valve of San Jose, Calif., or Sizto Tech Corporation (STC) of Palo Alto, Calif. Pressurized fluid sources (for example, compressors) suitable for the purposes described herein may be obtained from any of a variety of vendors (for example, ACDelco of Grand Blanc, Mich.)

Controller 18 may be a system controller already installed in the vehicle (for example, during vehicle manufacture), or the controller may be a dedicated energy-absorbing mechanism controller. The energy-absorbing mechanism 14 may be activated responsive to a signal received by controller 18 from a suitable speed sensor (or sensors) 20.

In the embodiments described herein, the pedestrian protection system 10 is an active system, meaning that an energy-absorbing mechanism 14 as described herein is selectively deployable from a stowed or undeployed condition (for example, as shown in FIGS. 2A, 3A, 4A, 5B, 6A, 8A, 9A and 10-11) to a fully deployed condition (for example, as shown in FIGS. 2C, 3B, 4B, 5C, 6B, 8B, 9B and 11A-12) designed to engage a pedestrian, responsive to the occurrence of a predetermined condition or set of conditions. The energy-absorbing mechanism deploys in a moving vehicle prior to (and in case of) contact between the vehicle and a pedestrian.

In operation of particular embodiments, the system is configured so that when the vehicle is stationary or moving at a speed below a predetermined threshold speed V, the energy-absorbing mechanism remains in the non-deployed condition. The energy-absorbing mechanism deploys when the vehicle reaches the threshold speed V. The system maintains the energy-absorbing mechanism in the fully deployed condition until the vehicle speed falls below the threshold speed V.

In operation of other particular embodiments, the system is configured so that the energy-absorbing mechanism resides in a stowed or non-deployed condition when the vehicle is travelling at a speed below a first predetermined threshold and also reverts to the non-deployed condition when the vehicle is traveling at a speed above a second predetermined threshold greater than the first predetermined threshold. The energy-absorbing mechanism deploys when the vehicle reaches a speed above the first predetermined threshold. In one particular embodiment, the first predetermined threshold is 10 MPH and the second predetermined threshold is 25 MPH. For purposes described herein, the controller may be operatively coupled to any sensor or other means (for example, a speedometer or wheel speed sensor) useable for measuring or calculating vehicle speed. The particular range (or ranges) of vehicle speeds over which the energy-absorbing mechanism is deployed may be determined by the vehicle manufacturer.

Referring again to FIG. 1, in embodiments described herein, the energy-absorbing mechanism 14 includes a pedestrian interface deployment mechanism (generally designated 14b) and a pedestrian interface 14a operatively coupled to the deployment mechanism 14b. The pedestrian interface 14a is generally positioned so as to be interposed between the deployment mechanism and a pedestrian during a collision event, so as to be the first portion of the energy-absorbing mechanism to absorb at least a portion of the vehicle-pedestrian contact energy. The pedestrian interface also serves as the medium through which vehicle-pedestrian contact forces are transmitted to the deployment mechanism. The pedestrian interface 14a is also coupled to the deployment mechanism 14b such that activation of the deployment mechanism 14b results in movement of the pedestrian interface 14a from a stowed position to the deployed (or pedestrian-engaging) position, or from the deployed position back to the stowed position. The energy-absorbing mechanism 14 is thus fully and automatically resettable into a pre-deployment or non-deployed configuration when the vehicle is stationary and/or travelling at a speed within one or more predetermined speed ranges.

In certain embodiments described herein, the pedestrian interface 14a is structured and positioned to make direct contact with the pedestrian in the event of a collision between the pedestrian and the vehicle. When the pedestrian contacts the pedestrian interface, the contact energy is transferred to the pedestrian interface and (optionally) to the deployment mechanism, to aid in cushioning the pedestrian impact.

In other embodiments, the pedestrian interface is operatively coupled to the deployment mechanism and also to another portion of the vehicle which may be contacted by a pedestrian during a collision event. When deployed, the pedestrian interface 14a resides between the deployment mechanism and the other portion of the vehicle. Activation of the deployment mechanism deploys the pedestrian interface to its deployed position or condition which, in turn, moves the other portion of the vehicle to a pedestrian-engagement position or configuration prior to contact with the pedestrian. When the pedestrian contacts the other portion of the vehicle, the contact energy is transferred to the pedestrian interface and (optionally) to the deployment mechanism, to aid in cushioning the pedestrian impact.

The pedestrian interface is structured to absorb at least a portion of the vehicle-pedestrian contact energy. To this end, pedestrian interface 14a may be formed from any suitable energy-absorbing material or combination of materials, for example, a foam material, a polymer, a rubber or other spring-like material, a silicone, one or more metallic materials, and/or any other suitable material or combination of materials.

In certain embodiments, the pedestrian interface is structured and attached to the pedestrian interface deployment mechanism so as to transfer and/or more effectively distribute the vehicle-pedestrian contact loads to the deployment mechanism structure, which may also be structured to absorb a portion of the vehicle-pedestrian contact to energy.

In embodiments described herein, the pedestrian interface deployment mechanism is configured to move the interface between a stowed position and a deployed position responsive only to a speed of the vehicle.

Figure 4A:
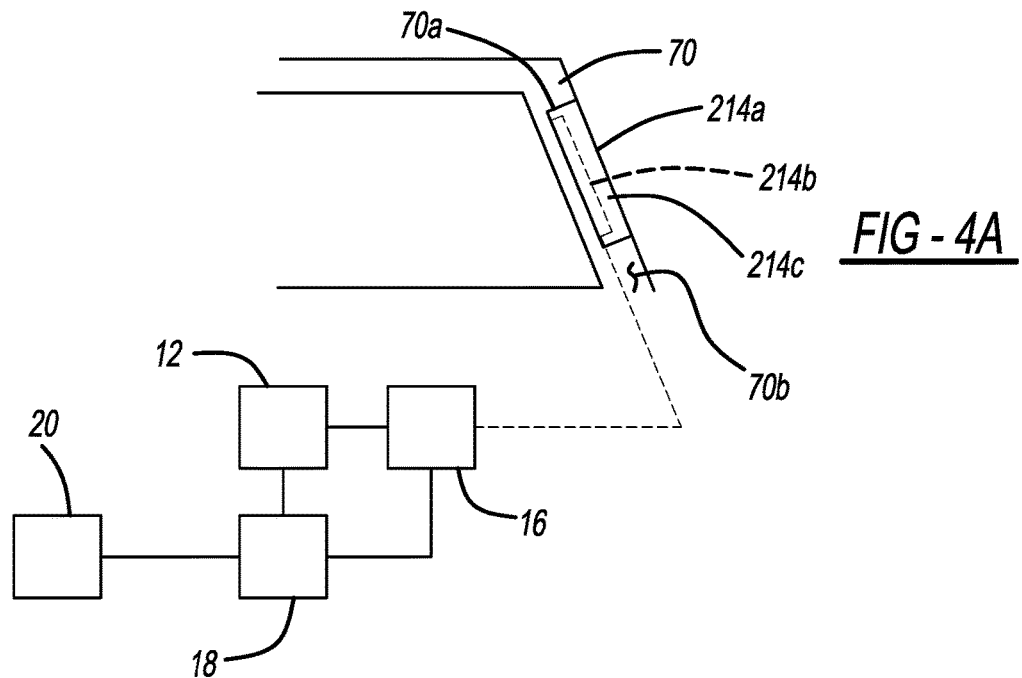
FIGS. 4A-4B show a schematic representation of a deployment progression of a pedestrian interface, from a non-deployed or stowed condition to a deployed position or condition, in accordance with another embodiment described herein.

In certain embodiments described herein (for example, as shown in FIGS. 2A, 3A and 4A), the pedestrian interface (and, optionally, the associated deployment mechanism) is structured to be nested or received within a cavity formed in a surface of the vehicle exterior exposed to contact by a pedestrian. The pedestrian-facing or exterior-facing surfaces of the pedestrian interface may also be structured to conform to or be flush with the exterior surfaces of the portion(s) of the vehicle into which the cavity is formed, and into which the pedestrian interface is received when not in a deployed position. Thus, in the stowed position, the pedestrian interface 14a does not increase the overall length or other exterior dimensions of the vehicle.

An example of these conditions is shown in FIGS. 2A-2C and 3A-3B, which show pedestrian interfaces 114a, 314a received within a cavity 99a formed in a forward-facing surface 99b of a vehicle bumper 99. When the pedestrian interfaces 114a, 314a are received within cavity 99a in a stowed condition (FIGS. 2A, 3A), the forward-most or pedestrian contact surfaces 114c, 314c of the respective pedestrian interfaces 114a, 314a are flush with the forward-most surface 99b of the bumper. Thus, in the stowed position, the pedestrian interfaces 114a, 314a do not increase the overall length of the vehicle (that is, when stowed, the pedestrian interfaces 114a, 314a do not extend past where a conventional vehicle bumper would extend).

Another example of the conditions described above is shown in FIGS. 4A-4B, in which a pedestrian interface 214a is received in a cavity 70a formed in a vehicle A-pillar 70. When the pedestrian interface 214a is received within cavity 70a in a stowed condition (FIG. 4A), the exterior or pedestrian contact surface 214c of the interface 214a is flush with the exterior surfaces 70b of the A-pillar.

In alternative embodiments, the pedestrian interface is structured to extend beyond an exterior surface of the vehicle portion in which it is received, to enable variations in styling of the vehicle portion and also to enable the pedestrian interface to be thickened to increase available pedestrian interface crush-space or otherwise modified so as to increase its energy-absorption capability.

In certain embodiments (for example, the embodiments shown in FIGS. 2A-2C, 4A-4B and 6A-6B), the deployment mechanism is in the form of an inflatable member or device (such as an airbag, bladder, or other inflatable device, for example) positioned within a cavity formed in a portion of the vehicle. The pedestrian interface may be attached to a forwardly-positioned portion of the inflatable device, and is moved to the fully deployed position prior to contact with the pedestrian by inflating the inflatable deployment mechanism. The pedestrian interface remains in the stowed position while the vehicle is stationary. At vehicle speeds at which the pedestrian interface is deployed, inflation of the inflatable device extends the attached energy-absorbing mechanism from its non-deployed or stowed position to its deployed position. At vehicle speeds at which the pedestrian interface is to return to a stowed condition, the inflatable deployment device may be deflated or evacuated by venting pressurized fluid from the inflatable device or by reversing the direction of fluid flow to actively evacuate the device, causing the pedestrian interface to retract back into a stowed position within its storage cavity.

An example of a deployment mechanism in the form of an inflatable device is shown in FIGS. 2A-2C. FIG. 2A shows the deployment mechanism 114b in a stowed, pre-inflated condition. When the energy-absorbing mechanism is activated, a pressurized fluid is introduced into the inflatable device 114b, causing expansion of the device. As the inflatable device expands, the attached energy-absorbing pedestrian interface 114a moves out of the bumper cavity 99a (FIG. 2B) to the fully deployed position shown in FIG. 2C. When the energy-absorbing mechanism is to be de-activated, the inflatable device is evacuated or otherwise deflated, causing the inflatable member 114b to retract back into cavity 99a.

Figure 4B:
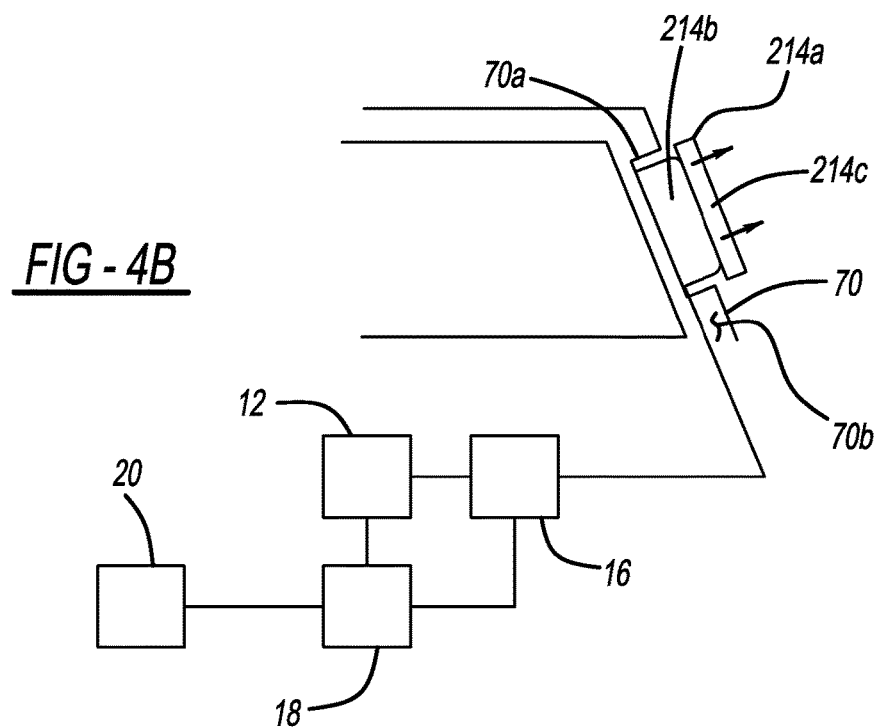

Another example of a deployment mechanism in the form of an inflatable device is shown in FIGS. 4A-4B. FIG. 4A shows the deployment mechanism 214b in a stowed, pre-inflated condition. When the energy-absorbing mechanism is activated, a pressurized fluid is introduced into the inflatable device 214b, causing expansion of the device. As the inflatable device expands, the attached energy-absorbing pedestrian interface 214a moves out of the A-pillar cavity 70a to the fully deployed position shown in FIG. 4B. When the energy-absorbing mechanism is to be de-activated, inflatable member 214b is evacuated or otherwise deflated, causing the inflatable member to retract back into cavity 70a.

Figure 5A:
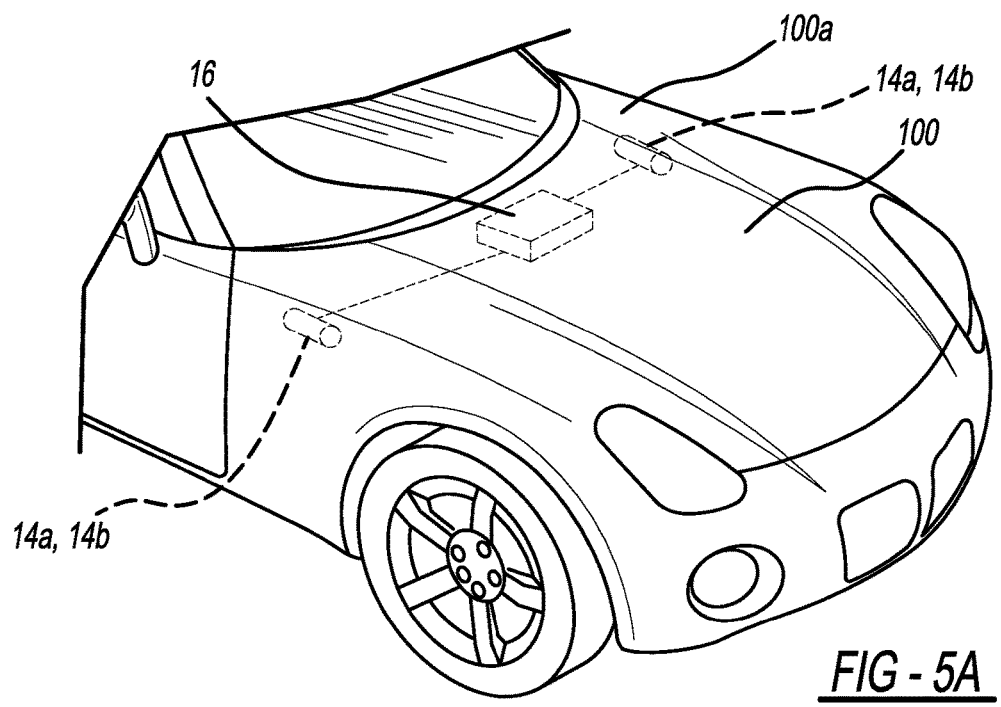
FIG. 5A is a schematic perspective view of a portion of a vehicle incorporating a pedestrian safety system using an embodiment of an energy-absorbing member deployment mechanism and an energy-absorbing member as described herein.
Figure 6A:
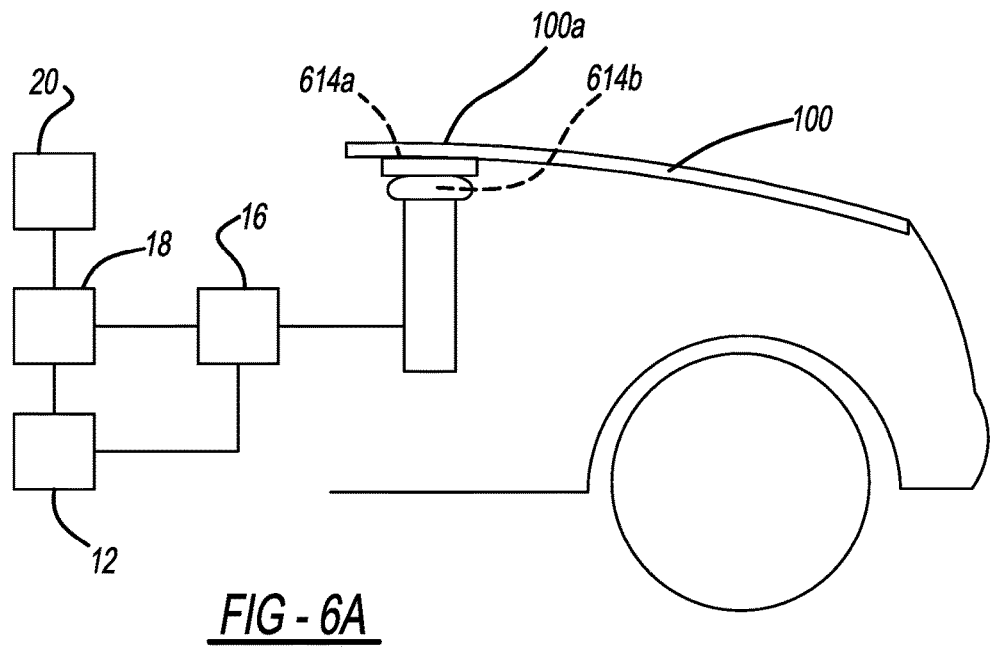
FIGS. 6A-6B show side schematic views of the arrangement shown in FIG. 5A, illustrating deployment of a pedestrian interface from a non-deployed or stowed condition to a deployed position or condition, in accordance with another embodiment described herein.
Figure 6B:
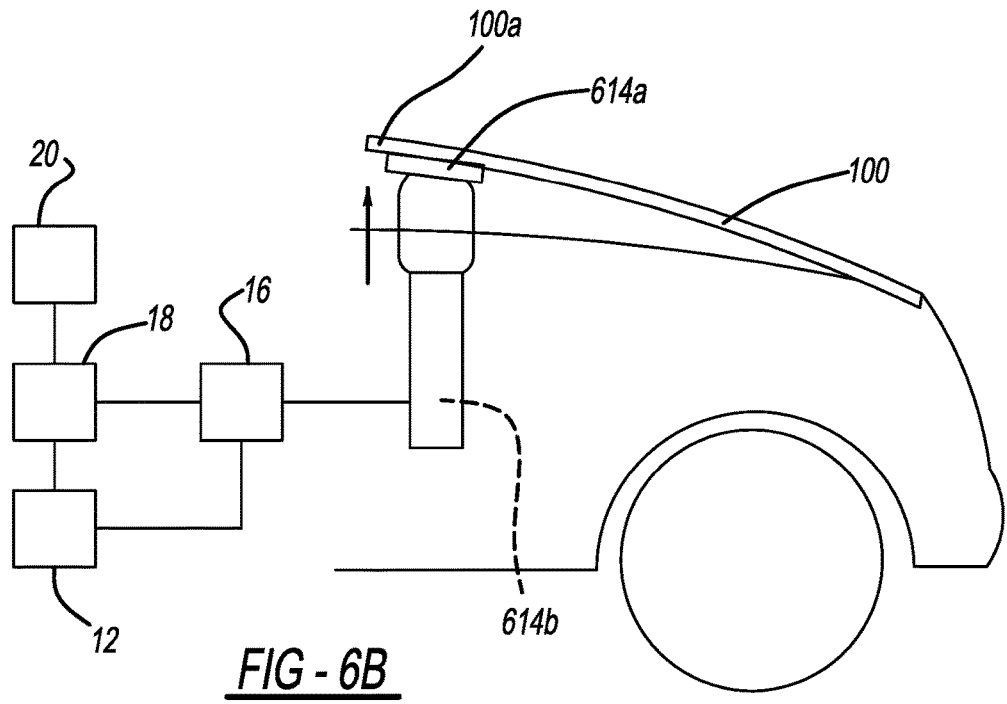

Another example of a deployment mechanism in the form of an inflatable device is shown in FIGS. 5A and 6A-6B. FIG. 5A is a schematic perspective view of a portion of a vehicle incorporating a pedestrian safety system using an embodiment of an interface deployment mechanism and an energy-absorbing pedestrian interface as described herein. FIG. 6A shows an inflatable deployment mechanism 614b in a stowed, pre-inflated condition. When the energy-absorbing mechanism is activated, a pressurized fluid is introduced into the inflatable device 614b, causing expansion of the device. As the inflatable device expands, the energy-absorbing pedestrian interface 614a (attached to the inflatable device 614b and to rear portion 100a of vehicle hood 100) moves to the fully deployed position shown in FIG. 6B. When the energy-absorbing mechanism is to be de-activated, inflatable member 614b is evacuated or otherwise deflated, returning the energy-absorbing member 614a to its stowed position and moving the attached hood rear portion 100a to its normal operating position.

Figure 6C:
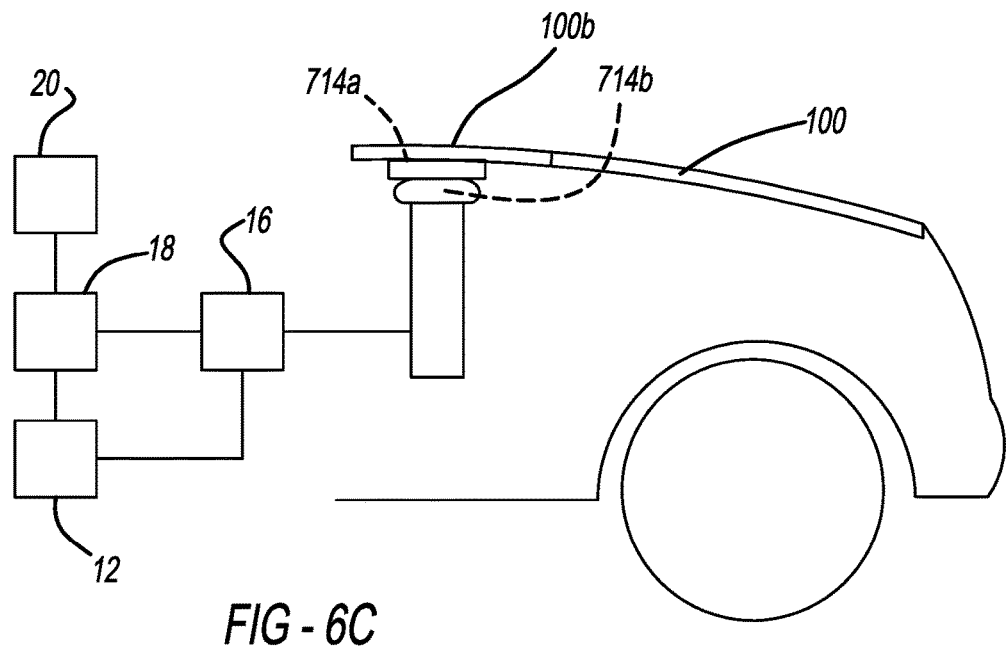
FIG. 6C is a side schematic view of a portion of a vehicle incorporating a pedestrian safety system using another embodiment of an energy-absorbing member deployment mechanism and an energy-absorbing member, and illustrating the deployment mechanism and energy-absorbing member in a non-deployed or stowed condition.
Figure 6D:
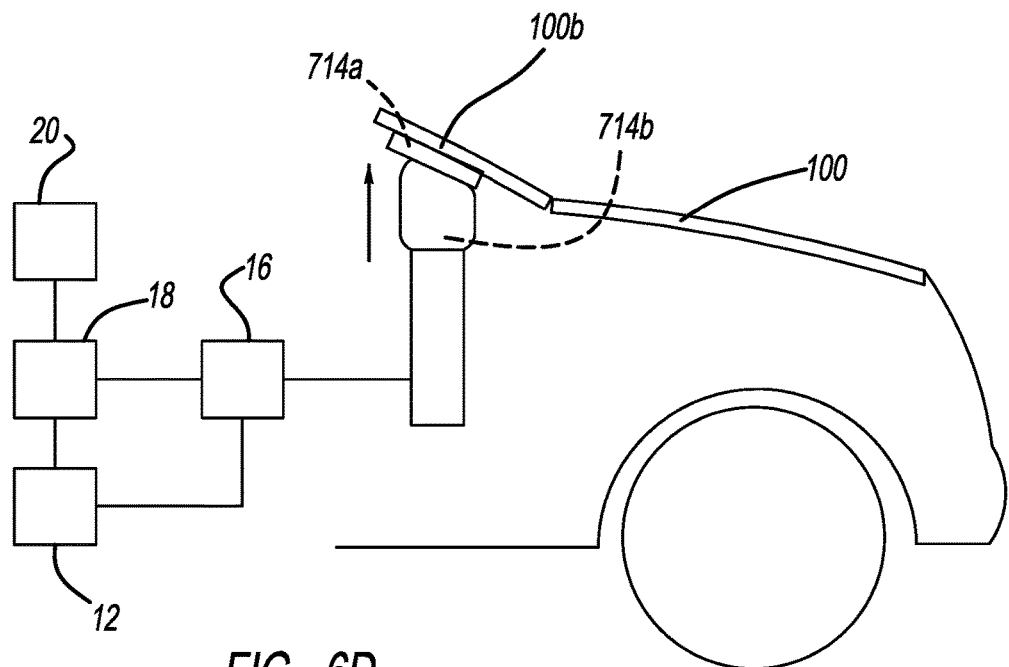
FIG. 6D is the side schematic view of FIG. 6C, showing deployment of the deployment mechanism and energy-absorbing member of FIG. 6C.

Another example of a deployment mechanism in the form of an inflatable device is shown in FIGS. 6C-6D. The vehicle shown in FIGS. 6C-6D incorporates a movable cowl panel 100b positioned between the rear edge of the hood 100 and the base of the vehicle windshield. This panel may house windshield wipers and/or other components and may be hingedly or otherwise rotatably connected to the hood or to another portion of the vehicle. FIG. 6C shows an inflatable deployment mechanism 714b in a stowed, pre-inflated condition. When the energy-absorbing mechanism is activated, a pressurized fluid is introduced into the inflatable device 714b, causing expansion of the device. As the inflatable device expands, the pedestrian interface 714a (attached to the inflatable device 714b and to cowl panel 100b) moves to the fully deployed position shown in FIG. 6D. When the energy-absorbing mechanism is to be de-activated, inflatable member 714b is evacuated or otherwise deflated, returning the energy-absorbing member 714a to its stowed position and moving the attached cowl panel 100b to its normal operating position.

The inflatable member may be structured to help ensure that it inflates or expands in a desired direction, and also that it contracts in the opposite direction when it is evacuated. This structure helps ensure that the pedestrian interface is consistently and automatically re-seated in its stowage cavity between deployments. In one embodiment, the inflatable member has an expandable accordion or bellows-like structure structured to expand in a predetermined direction during inflation. Other suitable structures may also be used. Pressurized fluid source(s) for the inflatable member may include, for example, a reservoir charged by operation of a compressor, pump and/or other known elements; a compressor, pump, and/or other known elements for supplying pressurized gas directly to and/or for extracting gas from the inflatable member; or any other suitable fluid source. A separate pressurized fluid source may be operatively coupled to each inflatable member. Alternatively, a common pressurized fluid source may be coupled to multiple inflatable members.

Certain mechanisms usable as deployment mechanisms for deploying the pedestrian interface are described in U.S. application Ser. No. 14/557,385, the disclosure of which is incorporated herein by reference in its entirety. Referring to FIGS. 8A-9B, in certain embodiments, the deployment mechanism is in the form of one or more swingable deployment arms 814b operatively coupling pedestrian interface to a portion of the vehicle. The embodiments shown in FIGS. 8A-9B utilize two deployment arms, with one arm connected to the pedestrian interface 814a proximate each end of the member. However, any desired number of deployment arms may be used. Also, arms 814b may be connected to the pedestrian interface at any desired location or locations, depending on the operational, structural or dimensional requirements of the particular application. In addition, arms 814b may be rotatably coupled to a housing 40 (as shown in FIG. 7A) mountable to the vehicle or directly to a portion of the vehicle (for example, to vehicle frame 90 shown in FIG. 8A). Also, in addition to controller 18 and any required sensors, each of the embodiments shown in FIGS. 8A-9B may include any pressurized fluid sources, valving, electronic controls, and/or any other components known in the art and required for functioning of the particular embodiment as described herein.

Pressurized fluid source(s) for a system employing swingable arms may include, for example, a pressurized gas reservoir charged by operation of a compressor, pump and/or other known elements; a reservoir, pump, and/or other known elements for a pneumatic or other pressurized gas system or hydraulic system; or any other suitable fluid source. A separate pressurized fluid source may be operatively coupled to each swingable arm 814b. Alternatively, a common pressurized fluid source may be coupled to both swingable arms.

In the embodiments shown in FIGS. 8A-9B, arms 814b and the pedestrian interface 814a attached thereto reside in a stowed condition as previously described, prior to activation of the pedestrian protection system. Arms 814b are operatively coupled to the vehicle so as to swivel or rotate along a pre-defined arc relative to the vehicle to deploy pedestrian interface 814a.

Figure 8A:
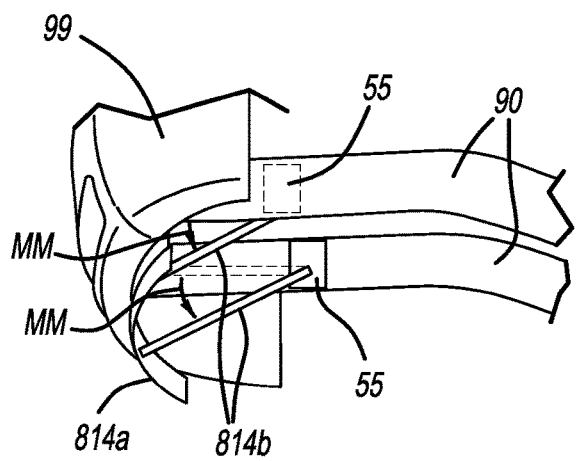
FIGS. 8A-8B show a schematic representation of a deployment progression of a pedestrian interface, from a non-deployed or stowed condition to a deployed position or condition, in accordance with another embodiment described herein.
Figure 8B:
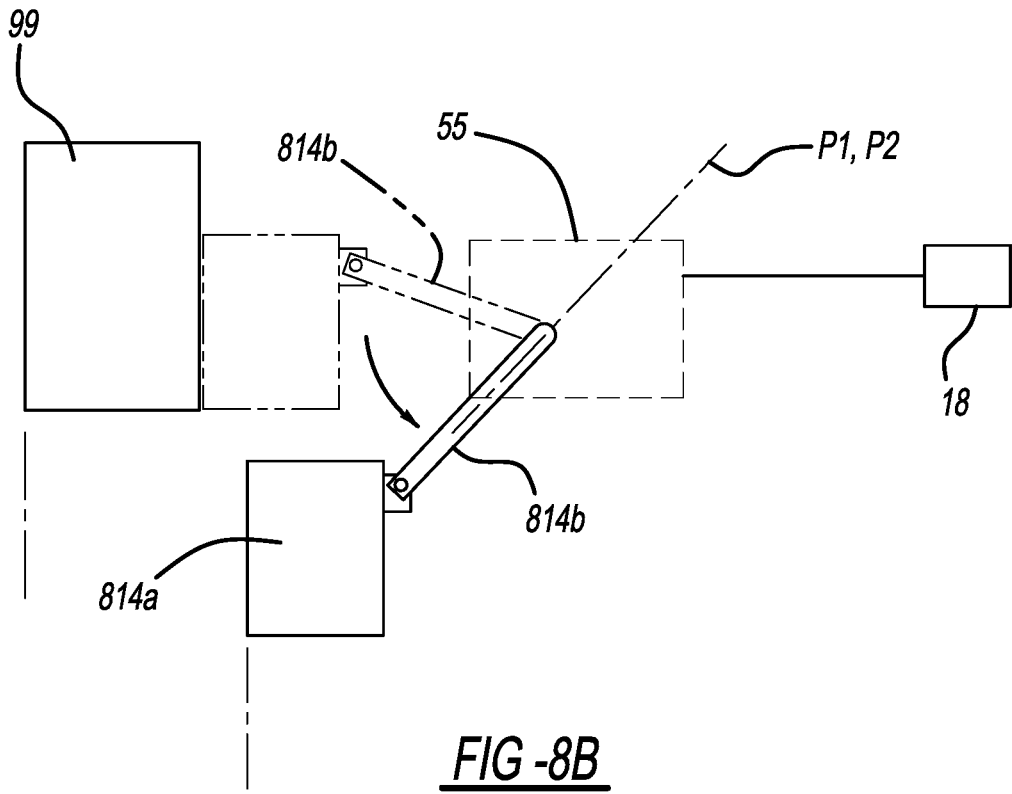
Figure 9A:
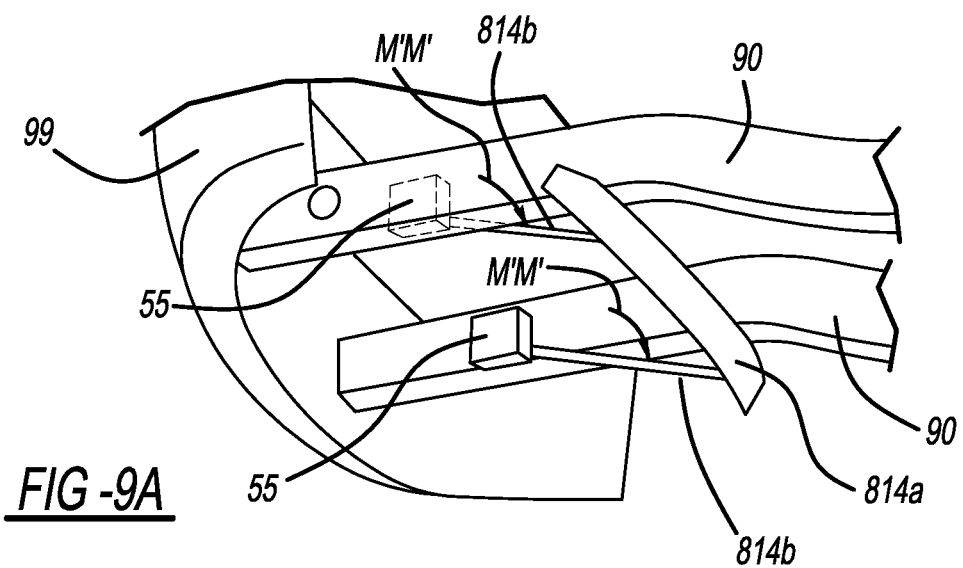
FIGS. 9A-9B show a schematic representation of a deployment progression of a pedestrian interface, from a non-deployed or stowed condition to a deployed position or condition, in accordance with another embodiment described herein.
Figure 9B:
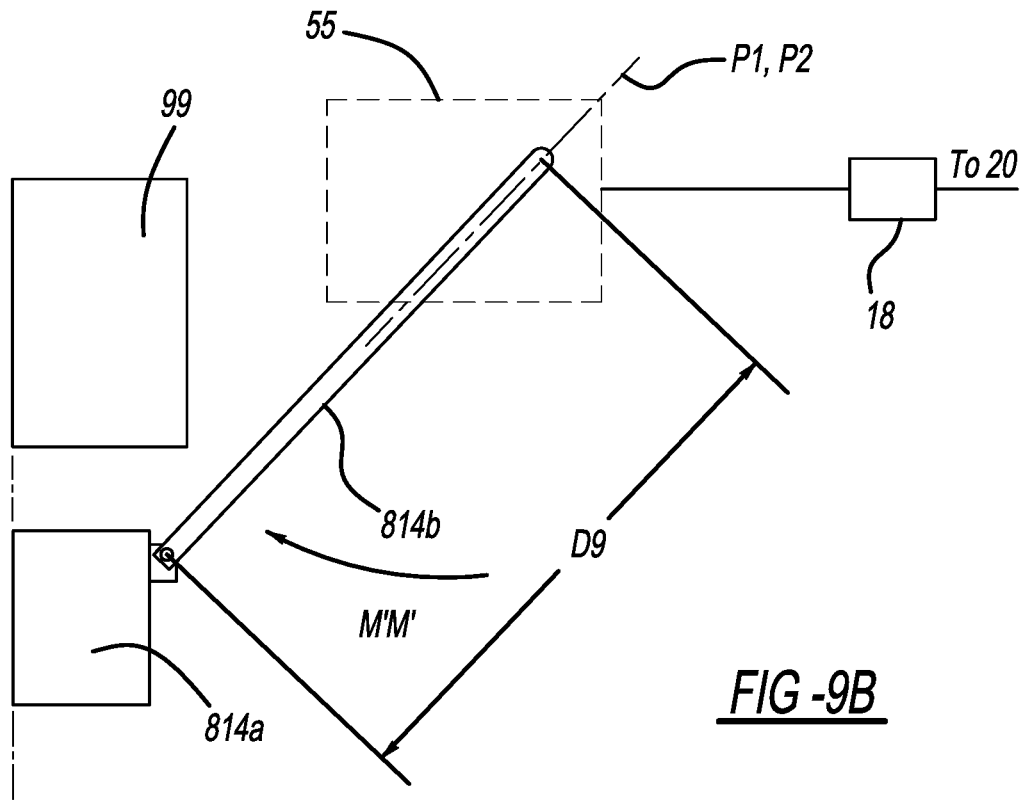

FIG. 8A shows the swingable arms and the pedestrian interface 814a in a stowed or pre-activation condition. In the embodiment shown in FIGS. 8A-8B, after system activation, the deployment arms 814b move from their stowed positions, swinging or rotating generally downwardly as indicated by arrows MM to position attached the pedestrian interface 814a below the vehicle bumper 99 as shown in FIG. 8B. FIG. 9A shows the swingable arms 814b and the pedestrian interface 814a in a stowed or pre-activation condition in another embodiment of the system. In the particular embodiment shown in FIGS. 9A-9B, after system activation, the deployment arms 814b move from their stowed positions, swinging or rotating generally forwardly and downwardly as indicated by arrows M'M' to position the pedestrian interface 814a below the bumper 99 as shown in FIG. 9B.

Arms 814b may be operatively coupled to any suitable type of known rotary actuator (generally designated 55), for example, a stepper motor and associated sensors and/or position encoder and other hardware; a stepper motor and associated gear train, sensors and/or position encoder and other hardware; a known fluid power rotary actuator and associated hardware, or any other suitable rotary actuator. Such actuators are available from a variety of vendors. A separate rotary actuator 55 may be coupled to each of arms 814b, or both arms may be rotated by a single rotary actuator 55 (as shown in FIG. 7A). The type of rotary actuator used will be specified according to such factors as the vehicle size envelope into which the pedestrian protection system is to be positioned, the torque requirements for a particular design of pedestrian interface 814a and rotating arms 814b, and other pertinent factors.

The rotary actuator(s) 55 are operatively coupled to controller 18. Upon receipt of an activation signal from the controller (and as described elsewhere herein), the rotary actuator (s) operate to swing the arms 814b downwardly and/or along the desired arcs until the pedestrian interface 814a reaches its deployment position. If desired, one or more hard stops (not shown) may be operatively coupled to arms 814b to limit rotation motion of the arms in a manner known in the art.

The pedestrian protection system may also be structured to maintain the pedestrian interface 814a in the fully deployed position responsive to reaction forces exerted on the leg-engaging member by a pedestrian in contact with the member. In an embodiment using pressurized fluid to control arm position, the reaction forces may be absorbed in a known manner by the pressurized fluid in the arms.

In an embodiment employing swingable or rotatable arms 814b, the arms may be structured to enable adjustment of the lengths of the arms (for example, using a telescoping structure), or to enable variation of the distance D9 (shown in FIG. 9B) between pivot locations of the arms on the housing or vehicle, and the locations on the arms 814b at which the pedestrian interface 814a is attached. This provides additional flexibility in positioning of the pedestrian interface 814a, as described elsewhere herein.

In certain embodiments (for example, in the embodiments shown in FIGS. 3A-3B and 5B-5C) the deployment mechanism is in the form of one or more telescoping arms operatively coupling the pedestrian interface to a portion of the vehicle. The embodiments described herein utilize two spaced-apart telescoping arms, with each arm coupled to an associated portion of the pedestrian interface. However, any desired number of telescoping arms may be used. Also, the arms may be connected to the pedestrian interface(s) at any desired location or locations along the member(s), depending on the operational, structural or dimensional requirements of the particular application.

Figure 3B:
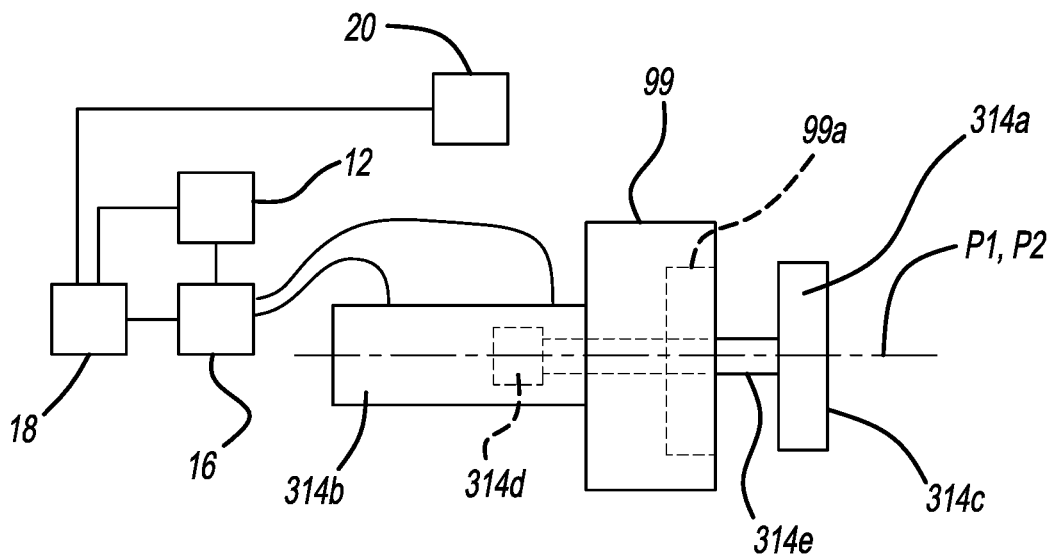

An example of a deployment mechanism in the form of one or more telescoping arms is shown in FIGS. 3A-3B. Referring to FIG. 3A, in one embodiment, each of arms 314b is in the form of a pneumatic or hydraulic piston-and-cylinder arrangement. A piston rod 314e is attached to the piston 314d so as to move along with the piston. A portion of the pedestrian interface 314a is coupled to an end of each piston rod 314e. In a known manner, upon activation of the energy-absorbing mechanism, fluid flow is directed by the valving mechanism 16 to either side of the piston in each cylinder 314 in a known manner, resulting in movement of the pistons 314d along interiors of their associated cylinders. This produces a corresponding movement of the pedestrian interface 314a attached to the ends of the rods 314e, to the fully deployed position of the pedestrian interface as shown in FIG. 3B.

Figure 5B:
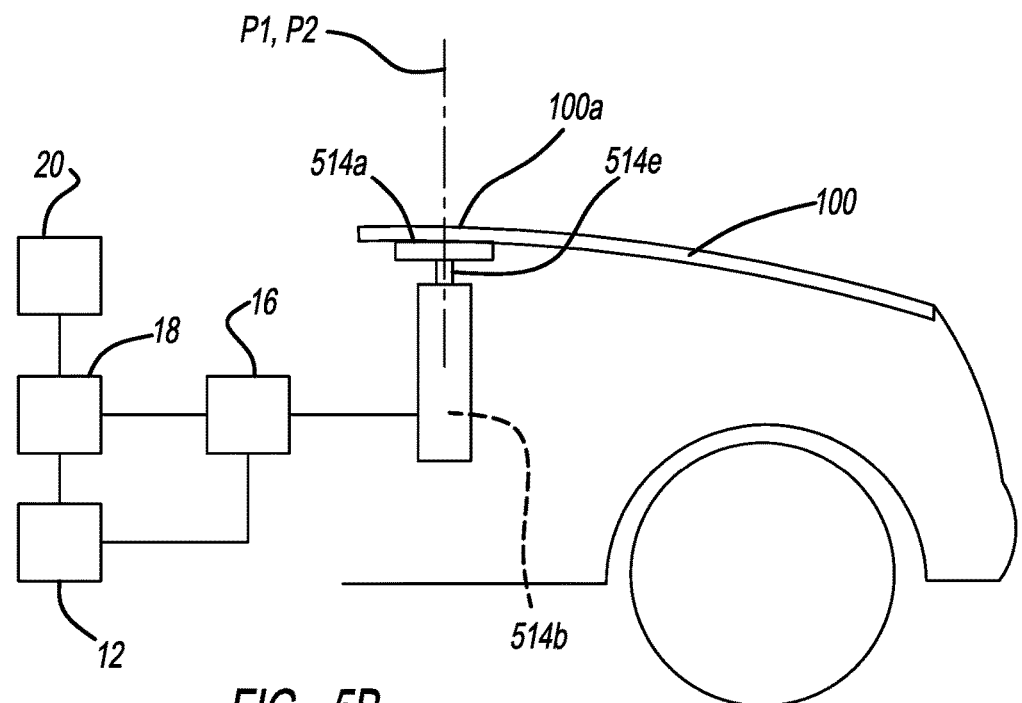
FIGS. 5B-5C show side schematic views of the arrangement shown in FIG. 5A, illustrating deployment of a pedestrian interface from a non-deployed or stowed condition to a deployed position or condition, in accordance with another embodiment described herein.
Figure 5C:
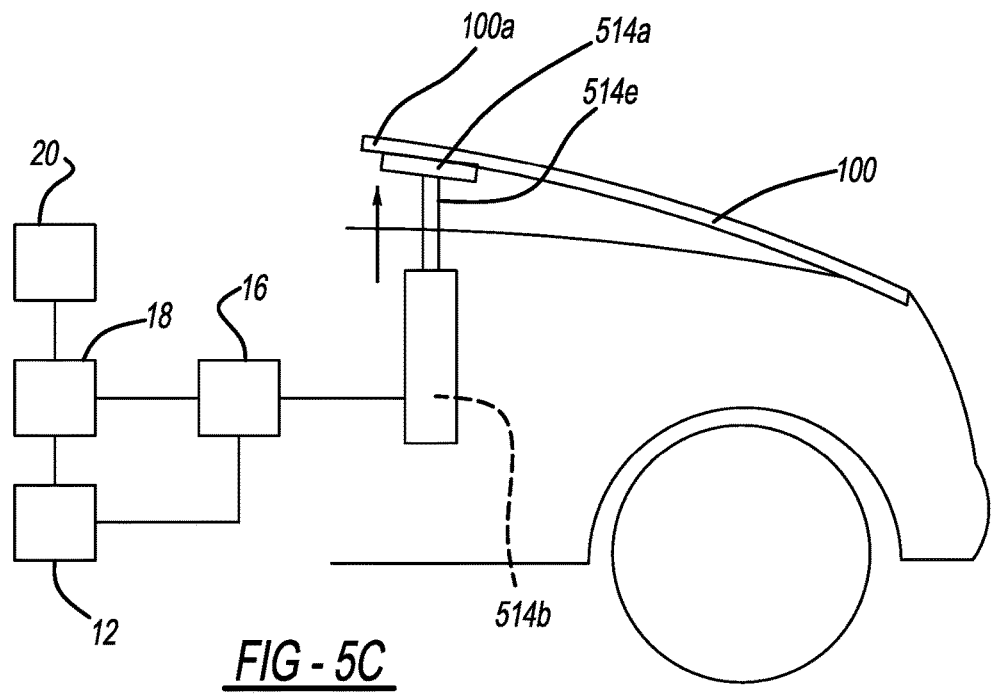

Another example of a deployment mechanism in the form of one or more telescoping arms is shown in FIGS. 5B-5C. The energy-absorbing member deployment mechanism and the energy-absorbing member represented in FIG. 5A may be in the form shown in FIGS. 6A-6B, as previously described, or FIGS. 5B-5C. Referring to FIG. 5B, in one embodiment, each of arms 514b is in the form of a pneumatic or hydraulic piston-and-cylinder arrangement. A piston rod 514e is attached to the piston (not shown) so as to move along with the piston. A portion of the pedestrian interface 514a is coupled to an end of each piston rod 514e. In a known manner, activation of the energy-absorbing mechanism causes pressurized fluid to be introduced into (or to flow within) the cylinders, resulting in movement of the pistons along interiors of their associated cylinders, thereby producing a corresponding movement of the pedestrian interface 514a attached to the ends of the rods 514e, to the fully deployed position of the pedestrian interface as shown in FIG. 5C. At the fully deployed position of the pedestrian interface, hood rear portion 100a is raised to a level above its normal operating position as shown.

In another embodiment, rather than using an inflatable member as a deployment mechanism as described with regard to FIGS. 6C-6D, a piston-and-cylinder arrangement and piston rod 514e as just described is used to move a cowl panel 100b as shown in FIGS. 6C-6D to a pedestrian-engaging position. A pedestrian interface 514a may be attached to an underside of the cowl panel as shown in FIGS. 6C-6D. When the energy-absorbing mechanism is activated, movement of the piston rod 514e rotates the pedestrian interface and cowl panel 100b in the manner shown in FIG. 6D, as previously described.

Figure 10:
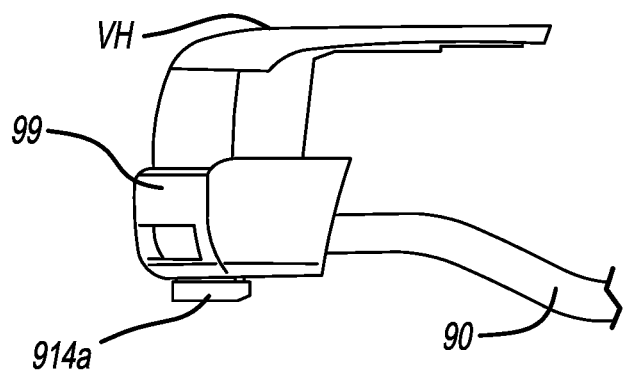
FIG. 10 is a partial side view of a front end of a vehicle including a pedestrian protection system in accordance with another embodiment described herein, shown in a stowed or non-deployed condition.
Figure 11:
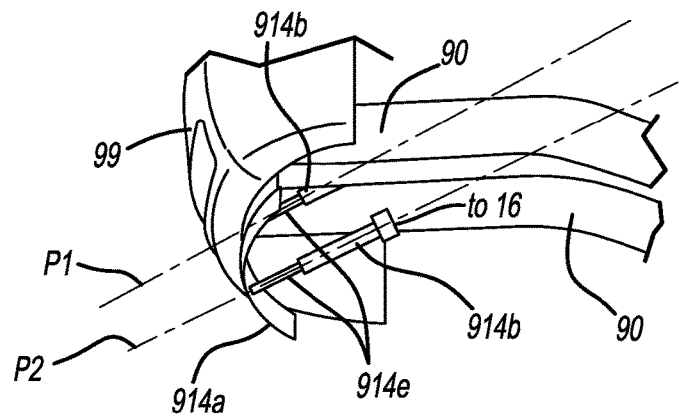
FIG. 11 is a partial perspective view of an underside of the front end of the vehicle of FIG. 10, showing the pedestrian protection system embodiment of FIG. 10.
Figure 11A:
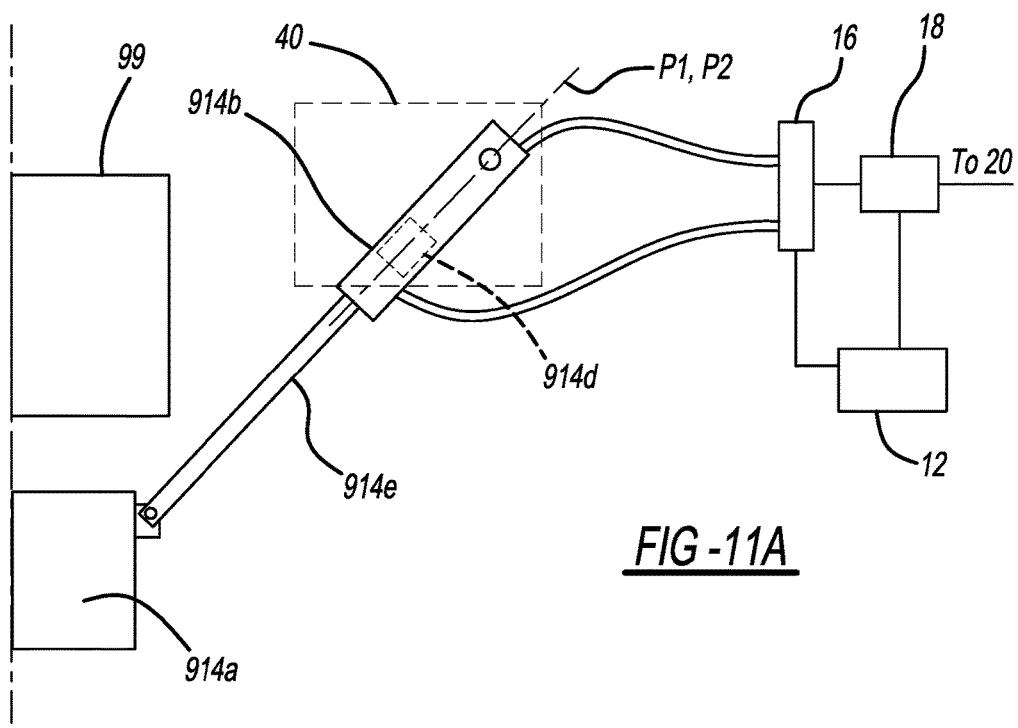
FIG. 11A is a schematic view of the pedestrian protection system of FIGS. 10 and 11 in a fully-deployed or extended condition.
Figure 12:
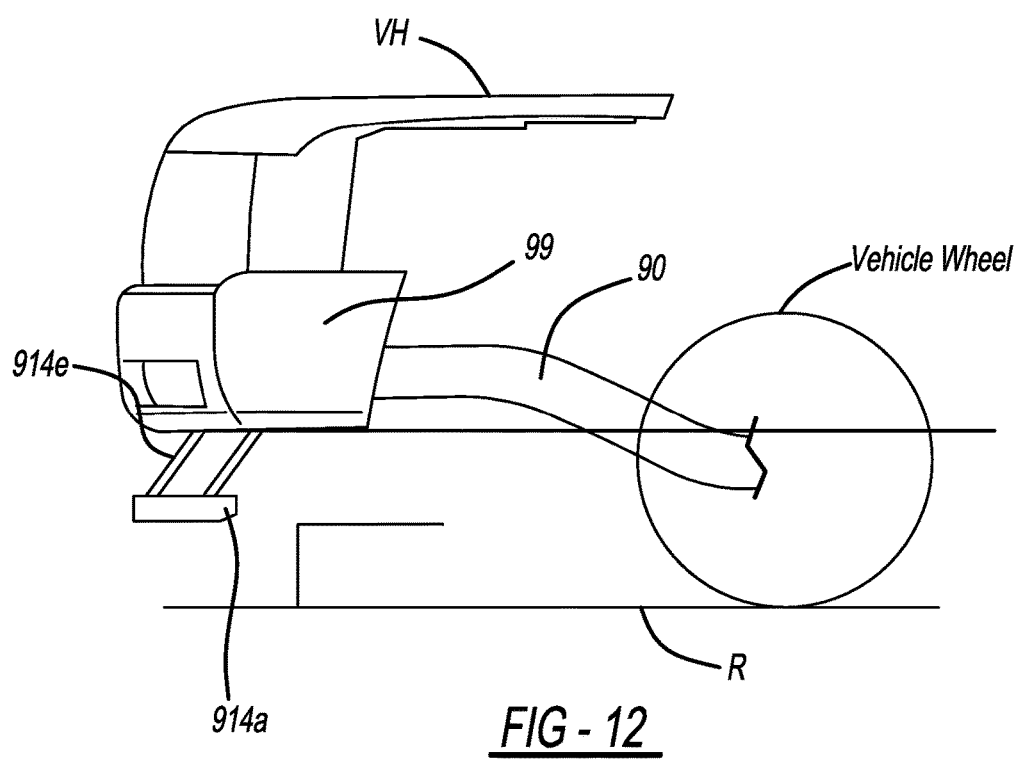
FIG. 12 is the side view of FIG. 10, showing the embodiment of the pedestrian protection system in the fully deployed or extended condition.

Another example of a deployment mechanism in the form of one or more telescoping arms is shown in FIGS. 10-12. Referring to FIG. 11A, in one embodiment, each of arms 914b is in the form of a pneumatic or hydraulic piston-and-cylinder arrangement. A piston rod 914e is attached to the piston 914d so as to move along with the piston. A portion of the pedestrian interface 914a is attached to an end of each piston rod 914e. In a known manner, activation of the pedestrian protection system causes pressurized fluid to be introduced into (or to flow within) the cylinders, resulting in movement of the pistons 914d along interiors of their associated cylinders. Movement of the pistons 914d produces movement of the rods 914e attached to the pistons, and also a corresponding movement of the pedestrian interface 914a attached to the ends of the rods 914e, to the fully deployed position of the pedestrian interface.

FIG. 11A shows one example of a system employing actuatable arms 914b in the form of piston-and-cylinder arrangements. In addition to arms 914b and pedestrian interface 914a, this embodiment of the system includes a controller 18 coupled to the arms 914b for controlling deployment of the pedestrian interface 914a in accordance with pre-determined criteria, and one or more pressurized fluid sources and associated fluid flow control mechanisms (including valving, solenoids, etc.) (generally designated 16) operatively coupled to the controller 18 and to the cylinders 914b and structured to provide pressurized fluid to the arms when desired.

Arms 314b, 514b, 914b may be structured, oriented and operatively coupled to the vehicle so that parallel longitudinal or thrust axes P1 and P2 of the cylinders (as shown in FIGS. 3A and 3B, for example) are directed toward or aligned with the final deployment position of the associated pedestrian interface 314a, 514a, 914a and so that the strokes of the arms, when actuated, move the pedestrian interface 314a, 514a, 914a into the desired fully deployed position.

Pressurized fluid source(s) for a system employing telescoping arms may include, for example, a reservoir charged by operation of a compressor, pump and/or other known elements for a pneumatic system; a reservoir, pump, and/or other known elements for a pneumatic or other pressurized gas system or hydraulic system; or any other suitable fluid source. A separate pressurized fluid source may be operatively coupled to each cylinder. Alternatively, a common pressurized fluid source may be coupled to both cylinders.

Other forms of the energy-absorbing member deployment mechanism and the energy-absorbing member are also contemplated. The particular method used to position or deploy the pedestrian interface prior to contact with a pedestrian will be determined by factors such as the available envelope size into which the pedestrian protection system may be installed; the distance of the pedestrian interface from the stowed position to the deployed position, and other pertinent factors.

In a particular embodiment, the pedestrian protection system includes a housing 40 to which other components of the pedestrian protection system (for example, pedestrian interface 14, sensor(s) 20, controller 18, any telescoping arms and/or swingable arms, and any associated actuation mechanism (not shown), and any other desired component(s)) may be mounted so as to form a module which may be affixed to the vehicle frame or to another suitable portion of the vehicle. The housing enables mounting of the pedestrian protection system components thereto and fixing of the positions and orientations of the components with respect to each other, to facilitate pedestrian protection system installation and proper operation of the system. The housing also enables the pedestrian protection system to be more easily retrofit onto an existing vehicle. Mounting aids such as suitable spacers or mounting brackets (not shown) may also be used to aid in attaching the housing to a given vehicle.

Figure 7:
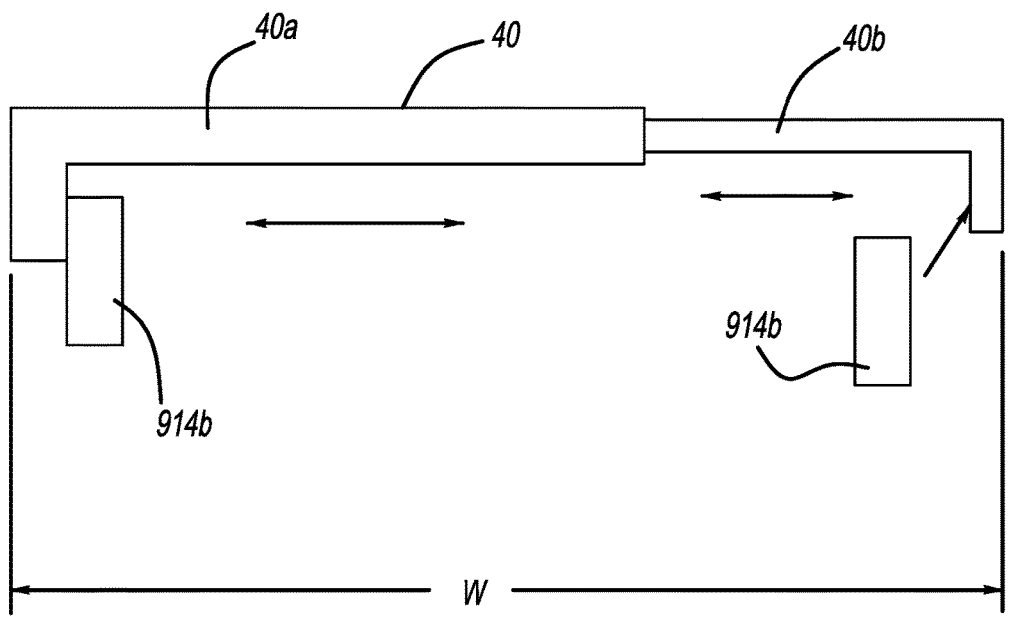
FIG. 7 is a schematic view of one embodiment of a pedestrian protection system housing to which other elements of the pedestrian protection system may be attached to facilitate installation in of the system a vehicle.
Figure 7A:
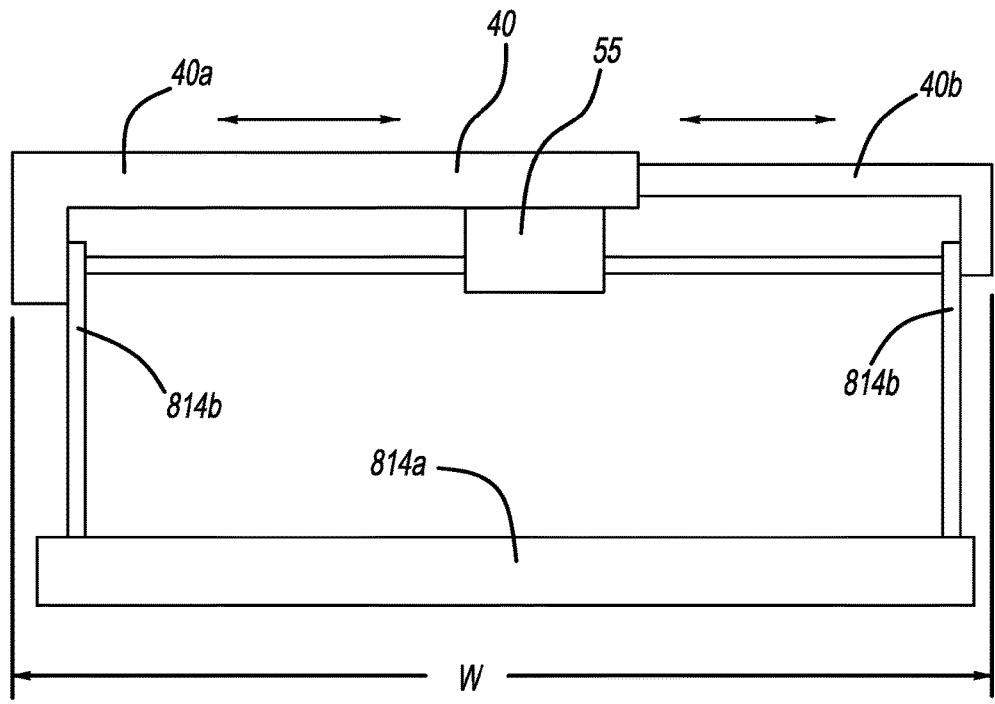
FIG. 7A is a schematic view of the pedestrian protection system housing of FIG. 7, showing one embodiment of a pedestrian interface operatively coupled thereto.

FIG. 7 is a schematic view of one embodiment of a housing 40 suitable for mounting the other pedestrian protection system components thereon. In the embodiment shown in FIG. 7, housing 40 includes a first portion 40a and a second portion 40b structured so as to be slidable or otherwise positionally adjustable with respect to the first portion when coupled to the first portion. In the embodiment shown, first and second portions 40a and 40b are structured to permit a width W of the housing (extending perpendicular to a fore-aft axis of the vehicle when mounted in the vehicle) to be adjusted, and the housing portions secured in position to maintain the desired width dimension. This adjustability of the housing width facilitates attachment of the housing to vehicle frames of various sizes. After the housing portions 40a and 40b have been fixed in position with respect to each other, other elements of the pedestrian protection system may be attached to the housing portions, using fasteners, welds, or any other suitable method or methods. Housing may be formed from any suitable material or materials (for example, metallic materials, polymers, etc.). The telescoping arms 914b may be attached to the housing portions as shown and in accordance with one of the embodiments described herein.

FIG. 7A is a schematic view similar to FIG. 7, showing an embodiment in which swingable or rotatable arms 814b are attached to housing 40. In the embodiment shown in FIG. 7A, arms 814b are shown rotatably attached to housing portions 40a and 40b. Arms 814b are rotated by a single rotary actuator 55 operatively coupled to the arms and to housing 40 (or directly to the vehicle). Alternatively, each of arms 814b may be operatively coupled to a separate rotary actuator. Although swingable arms 814b are shown mounted to the housing in FIG. 7A, a housing 40 may also be used to position and secure telescoping arms (such as arms 314b previously described) to the vehicle.

In addition, the other elements of the pedestrian protection system may be attached to the housing portions prior to fixing of the housing portions 40a and 40 in position with respect to each other. This permits the housing width W to be adjusted for attachment to portions of a specific vehicle, according to the requirements of a particular application and with the other system elements already attached.

In another embodiment, the housing 40 is formed as a single, unitary structure having a non-adjustable width W. The width dimension W is specified so as to facilitate mounting of the housing to a frame or portions of a specific vehicle design.

As described herein, the module may incorporate or be operatively coupled to an existing vehicle controller and/or sensors, or the module may be self-contained, incorporating its own controller and/or sensor(s) configured to actuate the pedestrian interface prior to contact between the vehicle and the pedestrian, according to one or more of the operational modes described herein.

In particular embodiments, the pedestrian protection system is structured such that the final positions and/or orientations of various components of the pedestrian protection system are adjustable with respect to the portions of the vehicle to which they are mounted. For example, any of the piston-cylinders arrangements previously described may be adjustable-stroke cylinders. Such cylinders are known in the pertinent art and are available from any of a variety of suppliers, for example TRD Manufacturing, Inc. of Machesney Park, Ill.

Also, where any of the deployable arms 814b, 914b are attached to a housing 40 as described herein, a portion of each cylinder may be rotatably attached to an associated housing portion to permit adjustment of the cylinder angular orientation with respect to the housing, according to the requirements of a particular application. The cylinder may be pivoted about the rotatable connection to provide the desired angular orientation, and then secured in this orientation using a pin, fasteners, or any other suitable securement mechanism. Alternatively, rotatability of the cylinder with respect to the vehicle frame may be provided by direct rotatable attachment of the cylinder to the vehicle frame. Alternatively, rotatability of the cylinder with respect to the vehicle frame may be provided by attachment of a suitable bracket to the frame, with respect to which the cylinder may be structured to rotate when coupled thereto. This enables adjustment of the orientation of the cylinder with respect to the vehicle frame without the need to mount the cylinder on a separate housing.

In addition, where any of the deployable arms 814b, 914b are attached to a housing 40 as described herein, the cylinders may be mounted to associated portions of the housing so as to permit slidable movement of the cylinder with respect to the housing along the axis (either axis P1 or P2, FIG. 3A-3B) of extension of the telescoping arms. The cylinder body may be slidably positioned along the housing according to the requirements of a particular application and then secured in a given position using a pin, fasteners, or any other suitable securement mechanism. Alternatively, slidability of the cylinder with respect to the vehicle frame may be provided by attachment of a suitable bracket or other hardware to the frame, along which the cylinder may be structured to slide when coupled thereto. This enables adjustment of the location of the cylinder along the deployment axis without the need to mount the cylinder on a separate housing.

In addition, the pedestrian interface may be rotatably connected to the ends of any cylinder piston rods or swingable arms (using for example, a pin), so as to permit adjustment of the angular orientation of the pedestrian interface with respect to the projected path of loading by the pedestrian, and in accordance with the final deployed position of the member. The pedestrian interface may be oriented as needed and secured in the desired orientation using any suitable method.

Other portions of the pedestrian protection system may also be positionally and/or rotationally adjustable so as to provide flexibility with regard to installation of the system in a vehicle, while ensuring that the fully deployed position of the pedestrian interface is attained after activation of the system. More specifically, the adjustability described provides flexibility in the positioning and attachment of the system components to the vehicle so as to ensure that the pedestrian interface, when fully deployed, resides at a desired predetermined location with respect to the vehicle bumper and with respect to a driving surface R of the vehicle.

In particular embodiments, both the deployment mechanism and the pedestrian interface coupled thereto are structured to absorb at least a portion of the pedestrian-vehicle contact energy when the pedestrian interface is in a deployed position. For example, the pedestrian interface may be formed from a suitable energy-absorbing material or materials as previously described, while the deployment mechanism may be a device (for example, an inflatable airbag or bladder) actuatable by a pressurized fluid and provided with a pressure relief valve or another suitable mechanism for controlled venting of the pressurized fluid contained therein, responsive to pedestrian-vehicle contact forces and/or to vent gases in the inflatable device while it is maintained in the inflated condition. Also, the piston-cylinder arrangements described herein may be provided with a relief valve or other mechanism for venting pressurized fluid or otherwise enabling a reduction in the actuation pressure responsive to contact between the pedestrian and the pedestrian interface. This aids the mechanism in absorbing the pedestrian-vehicle contact forces in a controlled manner.

In particular embodiments utilizing a piston-cylinder arrangement in the deployment mechanism, the energy-absorbing mechanism is structured such that the fully deployed position and/or orientation of the pedestrian interface is adjustable with respect to the portion of the vehicle to which it is mounted. For example, the cylinders may be adjustable-stroke cylinders, thereby enabling adjustment of the distance from the stowed position to which the pedestrian interface may be extended. Such cylinders are known in the pertinent art and are available from any of a variety of suppliers, for example TRD Manufacturing, Inc. of Machesney Park, Ill.

If desired, the controller 18 may also be coupled to an audible or otherwise detectable alarm (not shown) designed to notify the vehicle occupant (responsive to information received from a limit sensor or other suitable sensor coupled to the controller) of a failure of the pedestrian protection system to deploy, a condition which may indicate a malfunction of the system.

Using the principles described herein, an actuatable deployment mechanism and pedestrian interface may be incorporated into any suitable portion of the vehicle which may be contacted by a pedestrian during a collision, to provide a selectively deployable energy-absorbing mechanism which aids in reducing and/or absorbing the pedestrian-vehicle contact forces.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It will be understood that the foregoing description of the embodiments of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A method for cushioning a pedestrian during contact with a moving vehicle, comprising steps of:
providing a pedestrian interface that is disposable within an associated cavity defined by an A-pillar of the vehicle, the pedestrian interface cushioning the pedestrian during contact with the vehicle,
providing an interface deployment mechanism, the pedestrian interface being operatively coupled to the interface deployment mechanism, the interface deployment mechanism for moving the pedestrian interface between a stowed position and a deployed position,
moving the pedestrian interface to the deployed position when the vehicle is moving at or above a first predetermined speed, and
moving the pedestrian interface to the stowed position when the vehicle is moving below the first predetermined speed,
wherein at least a portion of the pedestrian interface is within the cavity in the stowed position and is outside the cavity in the deployed position.

2. The method of claim 1 wherein the interface deployment mechanism is disposed in the cavity.

3. The method of claim 1 wherein the interface deployment mechanism comprises an inflatable device.

4. The method of claim 1 wherein the pedestrian interface is disposed flush with an exterior surface of the portion of the vehicle in which the cavity is defined.

5. The method of claim 1 wherein the pedestrian interface comprises a foam material, a polymer material, a rubber material, a silicone material, a metallic material, and/or a combination thereof.

6. An active pedestrian protection system comprising:
a pedestrian interface for cushioning a pedestrian during a collision event between the pedestrian and a vehicle, wherein at least a portion of said pedestrian interface is disposed within an associated cavity defined by an A-pillar of the vehicle; and
an interface deployment mechanism operatively coupled to the pedestrian interface for moving the pedestrian interface between a stowed position within the cavity and a deployed position outside the cavity, wherein the pedestrian interface is disposed outside of the cavity in the deployed position, and wherein the pedestrian interface is moved to the deployed position in response to the vehicle moving at or above a first predetermined speed and is moved to the stowed position in response to the vehicle moving below the first predetermined speed.

7. The system of claim 6 wherein the interface deployment mechanism is disposed in the cavity.

8. The system of claim 6 wherein the deployment mechanism comprises an inflatable device.

9. The system of claim 6 wherein the pedestrian interface is disposed flush with an exterior surface of the portion of the vehicle in which the cavity is defined.

10. The system of claim 6 wherein the pedestrian interface comprises a foam material, a polymer material, a rubber material, a silicone material, a metallic material, and/or a combination thereof.

* * * * *